US012625049B2

(12) United States Patent     (10) Patent No.:   US 12,625,049 B2

Kim et al.     (45) Date of Patent:    May 12, 2026

(54) MICROPLASTIC DETECTION SENSOR AND MICROPLASTIC DETECTION SYSTEM USING THE SAME

(71) Applicant: KOREA ELECTRONICS TECHNOLOGY INSTITUTE, Seongnam-si (KR)

(72) Inventors: Jin Hyoung Kim, Uiwang-si (KR); Kyu Sik Shin, Seoul (KR); Cheol Ung Cha, Seoul (KR); Kwon Hong Lee, Seongnam-si (KR)

(73) Assignee: KOREA ELECTRONICS TECHNOLOGY INSTITUTE, Seongnam-si (KR)

( * ) Notice: Subject to any disclaimer, the term of this patent is extended or adjusted under 35 U.S.C. 154(b) by 323 days.

(21) Appl. No.: 18/405,560

(22) Filed: Jan. 5, 2024

(65) Prior Publication Data

US 2024/0337575 A1     Oct. 10, 2024

(30) Foreign Application Priority Data

Apr. 10, 2023    (KR) ........................ 10-2023-0046913

(51) Int. Cl.
    *G01N 15/02*       (2024.01)
    *G01N 15/06*       (2006.01)
        (Continued)

(52) U.S. Cl.
    CPC ......... *G01N 15/0272* (2013.01); *G01N 15/06* (2013.01); *G01N 22/00* (2013.01);
        (Continued)

(58) Field of Classification Search
    CPC .. G01N 15/0272; G01N 15/06; G01N 27/221; G01N 27/22; G01N 22/00;
        (Continued)

(56) References Cited

U.S. PATENT DOCUMENTS

2016/0047728 A1    2/2016   Wilson et al.
2019/0317167 A1    10/2019   Laborde et al.
        (Continued)

FOREIGN PATENT DOCUMENTS

CN     112798870 A   *   5/2021   ........... B01L 3/5027
CN     114354653 A   *   4/2022
        (Continued)

OTHER PUBLICATIONS

Machine translation of CN 112798870 (Year: 2021).*
        (Continued)

*Primary Examiner* — Nathaniel J Kolb

(74) *Attorney, Agent, or Firm* — Knobbe, Martens, Olson & Bear, LLP

(57) ABSTRACT

Proposed is a microplastic detection sensor for detecting information about microplastic contained in a sample. The sensor may include a fluidic channel substrate including an inlet and an outlet, and a plurality of RF resonance structures. The inlet may be formed on one end of the fluidic channel substrate, and the outlet may be formed on the other end. The fluidic channel substrate may have a microfluidic channel formed therein to connect the inlet and the outlet. The microfluidic channel may move the sample toward the outlet by capillary action. In the fluidic channel substrate, a plurality of capture parts, respectively corresponding to the RF resonance structures, may be formed along the microfluidic channel and may selectively capture the microplastic by particle size. The RF resonance structures may output information about the microplastic captured in the corresponding capture part through RF resonance for the applied RF signal.

16 Claims, 4 Drawing Sheets

(51) Int. Cl.
| | | |
|---|---|---|
| *G01N 22/00* | (2006.01) | |
| *G01N 29/22* | (2006.01) | |

(52) U.S. Cl.
CPC ..... *G01N 29/222* (2013.01); *G01N 2223/652* (2013.01); *G01N 2291/02416* (2013.01)

(58) Field of Classification Search
CPC ... G01N 2291/02416; G01N 2223/652; G01N 2223/623; G01N 1/4077; G01N 2035/00524
See application file for complete search history.

(56) References Cited

U.S. PATENT DOCUMENTS

| | | | |
|---|---|---|---|
| 2021/0255083 A1 | 8/2021 | Algre et al. | |
| 2023/0408396 A1* | 12/2023 | Hanay ................ | G01N 15/0266 |
| 2024/0269674 A1* | 8/2024 | Roy .................. | B01L 3/502761 |

FOREIGN PATENT DOCUMENTS

| | | | | | |
|---|---|---|---|---|---|
| CN | 218180715 | U | * | 12/2022 | |
| IT | TO20100319 | A1 | * | 10/2011 | ......... G01N 35/0098 |
| JP | 2022-024137 | A | | 2/2022 | |
| KR | 10-0850235 | B1 | | 8/2008 | |
| KR | 10-2021-0132476 | A | | 11/2021 | |
| KR | 10-2023-0007038 | A | | 2/2023 | |
| KR | 10-2499986 | B1 | | 2/2023 | |

OTHER PUBLICATIONS

Machine translation of CN 218180715 (Year: 2022).*
Machine translation of IT TO20100319 (Year: 2010).*
Machine translation of CN 114354653 (Year: 2022).*
Notice of Allowance received in Korean Patent Application No. 10-2023-0046913 dated Aug. 28, 2024 in 11 pages.

\* cited by examiner

MICROPLASTIC DETECTION SENSOR AND MICROPLASTIC DETECTION SYSTEM USING THE SAME

CROSS REFERENCE TO RELATED APPLICATIONS

The present application claims priority to Korean Patent Application No. KR 10-2023-0046913 filed Apr. 10, 2023, the entire contents of which are incorporated herein for all purposes by this reference.

BACKGROUND

Technical Field

The present disclosure relates to a microplastic detection technology. More specifically, the present disclosure relates to a microplastic detection sensor for detecting the concentration and type of microplastic particles contained in a sample by particle size and to a microplastic detection system using the sensor.

Description of Related Technology

Microplastic refers to small pieces of plastic less than 5 mm in size. In general, microplastic is manufactured from scratch or created when plastic products break down.

SUMMARY

One aspect is a microplastic detection sensor that can simply and quickly detect the concentration and type of microplastic by particle size, and a microplastic detection system using the same.

Another aspect is a microplastic detection sensor that includes a fluidic channel substrate having an inlet and an outlet, wherein the inlet through which a liquid sample containing microplastic dispersed in a dispersion liquid is introduced is formed on one end of the fluidic channel substrate, and the outlet is formed on the other end, the fluidic channel substrate further having a microfluidic channel formed therein to connect the inlet and the outlet and move the sample introduced through the inlet toward the outlet by capillary action, and the fluidic channel substrate further having a plurality of capture parts formed along the microfluidic channel and selectively capturing the microplastic contained in the sample according to particle size; and a plurality of radio frequency (RF) resonance structures corresponding to the plurality of capture parts, respectively, and formed on both sides of the fluidic channel substrate, each of the RF resonance structures outputting information about the microplastic captured in the corresponding capture part through RF resonance for an applied RF signal.

The microfluidic channel may be formed as a line-shaped tunnel, and a cross-section of the microfluidic channel may be formed so that a width is greater than a height.

The plurality of capture parts may be sequentially arranged from the inlet to the outlet along the microfluidic channel, and a particle size of the microplastic sequentially captured may become smaller.

The plurality of capture parts may be spaced apart from each other so that RF resonance is independently generated by an RF signal applied to each of the plurality of capture parts.

Each of the plurality of capture parts may include an extended portion having a buffering space that is larger than the microfluidic channel, the extended portion further having an inlet and an outlet such that the sample flows from the microfluidic channel into the buffering space through the inlet and is then discharged from the buffering space to the microfluidic channel through the outlet; and a filter formed inside the expanded portion and filtering a target microplastic among several types of the microplastic contained in the sample introduced into the expanded portion.

The filter may have a plurality of filter rods that are arranged at regular intervals inside the expanded portion and form a capture space that filters and captures the target microplastic. The capture space may be communicated with the inlet of the expanded portion to allow the sample to flow into the capture space. The interval between the filter rods may be smaller than a size of the target microplastic.

The fluidic channel substrate may include a lower substrate having the inlet, the outlet, the microfluidic channel, and the plurality of capture parts, formed on an upper surface thereof; and an upper substrate covering the upper surface of the lower substrate and having first and second through-holes connected to the inlet and outlet, respectively.

The lower substrate may be a silicon substrate, and the inlet, the outlet, the microfluidic channel, and the plurality of capture parts may be formed on the upper surface of the lower substrate through a micro-electro mechanical system (MEMS) process. The upper substrate may be made of glass, silicon, or quartz, and the first and second through-holes may be formed through the MEMS process.

Each of the plurality of RF resonance structures may include an upper resonance pattern formed on an upper surface of the upper substrate above the capture part; and a lower resonance pattern formed on a lower surface of the lower substrate below the capture part.

The RF resonance structure may be designed to perform RF resonance for applied RF signals in a 1 to tens of GHz band.

The RF resonance structure may receive an RF signal through electrical coupling and output a reflected wave.

Another aspect is a microplastic detection system that includes the above-mentioned microplastic detection sensor; a sample input unit injecting the liquid sample, which contains the microplastic dispersed in a solution, into the inlet of the microplastic detection sensor; a transceiver applying an RF signal to the plurality of RF resonance structures and receiving output signals outputted from the plurality of RF resonance structures through RF resonance for the applied RF signal; and a controller analyzing the applied RF signal and the output signals and calculating information about the microplastic captured in each of the plurality of capture parts.

The transceiver may apply the RF signal to the RF resonance structure through an electrical coupling scheme and receive a reflected wave as the output signal.

The controller may calculate an input reflection coefficient ($S_{11}$) based on the applied RF signal and the received reflected wave and calculate concentration and type of the microplastic captured in each of the plurality of capture parts.

The controller may calculate the concentration of the microplastic captured in each of the plurality of capture parts by checking a shift of resonance frequency based on the input reflection coefficient.

The controller may calculate the type of the microplastic captured in each of the plurality of capture parts by calculating a dielectric constant and loss tangent value depending on the type of the microplastic based on the input reflection coefficient.

According to the present disclosure, the microplastic detection sensor is capable of capturing microplastic contained in a sample by particle size and easily detecting the concentration and type of the captured microplastic for each particle size based on resonance characteristics using RF signals.

That is, the microplastic detection sensor according to the present disclosure can selectively capture and classify the microplastic contained in the sample by particle size through a plurality of capture parts provided in a microfluidic channel. In addition, by measuring a change in the scattering parameter (S-parameter) for an RF signal applied to an RF resonance structure provided in the plurality of capture parts, the microplastic detection sensor can detect the concentration and type of the microplastic captured in each capture part by particle size.

In addition, the microplastic detection sensor according to the present disclosure can be manufactured based on the MEMS process, so it can be mass-produced at low cost.

Additionally, since the microplastic detection sensor according to the present disclosure uses RF signals in the GHz band, the size of the sensor can be reduced.

In addition, since the microplastic detection system according to the present disclosure has a structure of supplying RF signals and receiving reflected waves through electrical coupling to and from the RF resonance structure of the microplastic detection sensor, the system structure can be simplified.

DETAILED DESCRIPTION

Figure 1:
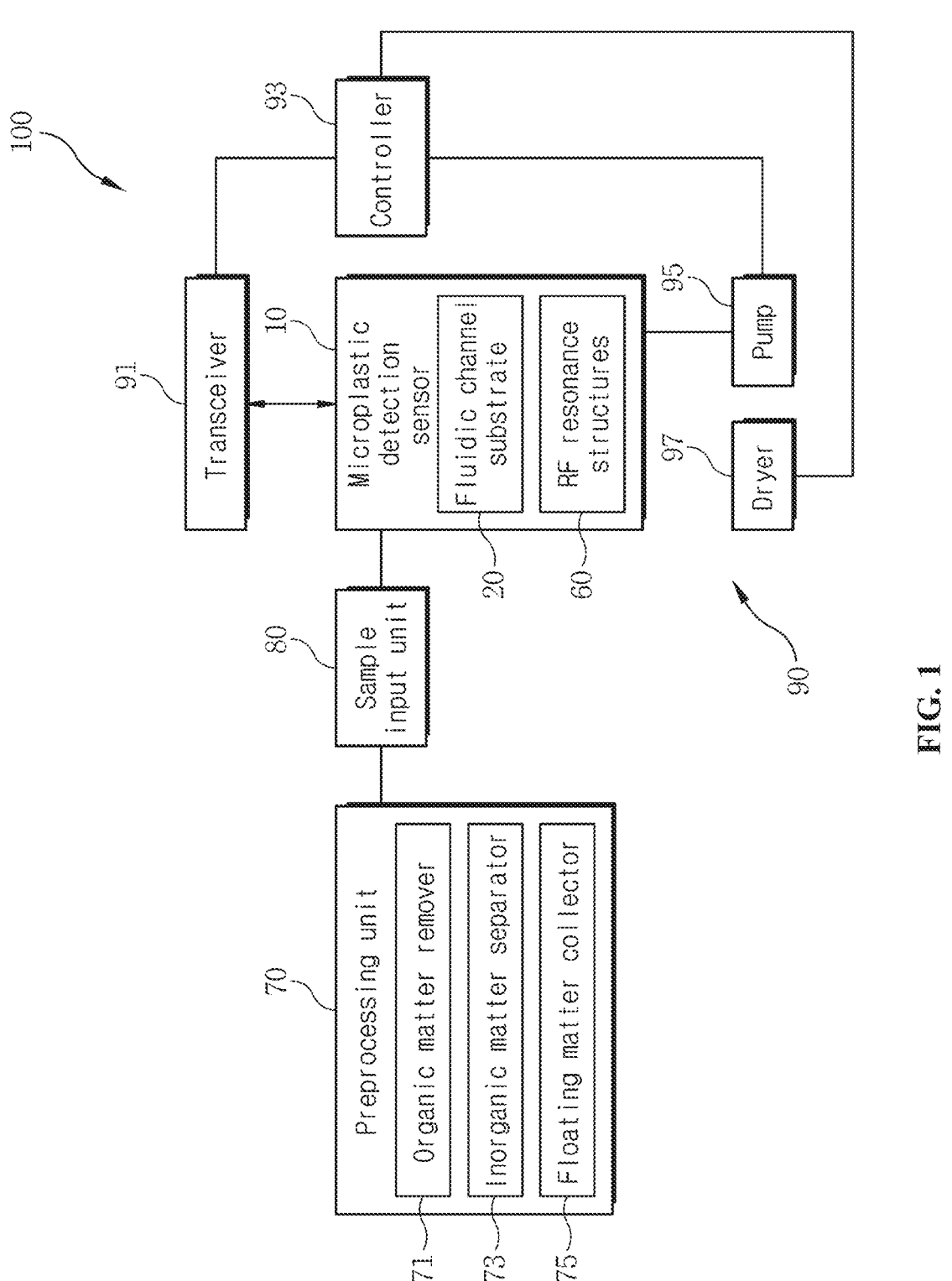
FIG. 1 is a block diagram showing a microplastic detection system using a microplastic detection sensor according to an embodiment of the present disclosure.

Microplastic is problematic in that it not only destroys the environment but also threatens human health. In other words, microplastic is contained in toothpaste, detergents, scrubs, etc. that are easily encountered in daily life, and is so small that it is not filtered out in sewage treatment facilities and flow into the sea and rivers. Human eventually consumes river and sea creatures that mistake microplastic for food, resulting in various health problems. For example, microplastic introduced into the human body can cause intestinal obstruction, reduce energy allocation, and have adverse effects on growth.

Due to the seriousness of this problem, laws regulating the use of microplastic are being passed around the world. In the United States, the 'Microbead-Free Waters Act' was passed in 2015, prohibiting the use of microplastic in products that are washed off with water. In Sweden, the use of microplastic in cosmetics is prohibited. In Korea, microplastic cannot be used in cosmetics since July 2017.

In order to prevent damage caused by microplastic, it is necessary to check the concentration of microplastic contained in a sample. The sample is a fluid containing water, and may be, for example, seawater, river water, lake water, tap water, sewage, wastewater, etc.

Typically, microplastic has been analyzed using optical analysis equipment. However, although optical analysis equipment has high accuracy in distinguishing types of microplastic, there is a problem in that it is not easy to calculate the concentration of microplastic because it calculates such concentration by visual inspection.

Now, embodiments of the present disclosure will be described in detail with reference to the accompanying drawings. However, in the following description and the accompanying drawings, well known techniques may not be described or illustrated in detail to avoid obscuring the subject matter of the present disclosure. Through the drawings, the same or similar reference numerals denote corresponding features consistently.

The terms and words used in the following description, drawings and claims are not limited to the bibliographical meanings thereof and are merely used by the inventor to enable a clear and consistent understanding of the disclosure. Thus, it will be apparent to those skilled in the art that the following description about various embodiments of the present disclosure is provided for illustration purpose only and not for the purpose of limiting the disclosure as defined by the appended claims and their equivalents.

FIG. 1 is a block diagram showing a microplastic detection system using a microplastic detection sensor according to an embodiment of the present disclosure. In addition, FIG. 2 is a schematic diagram showing a microfluidic channel having a plurality of capture parts in a microplastic detection sensor according to an embodiment of the present disclosure.

Figure 2:
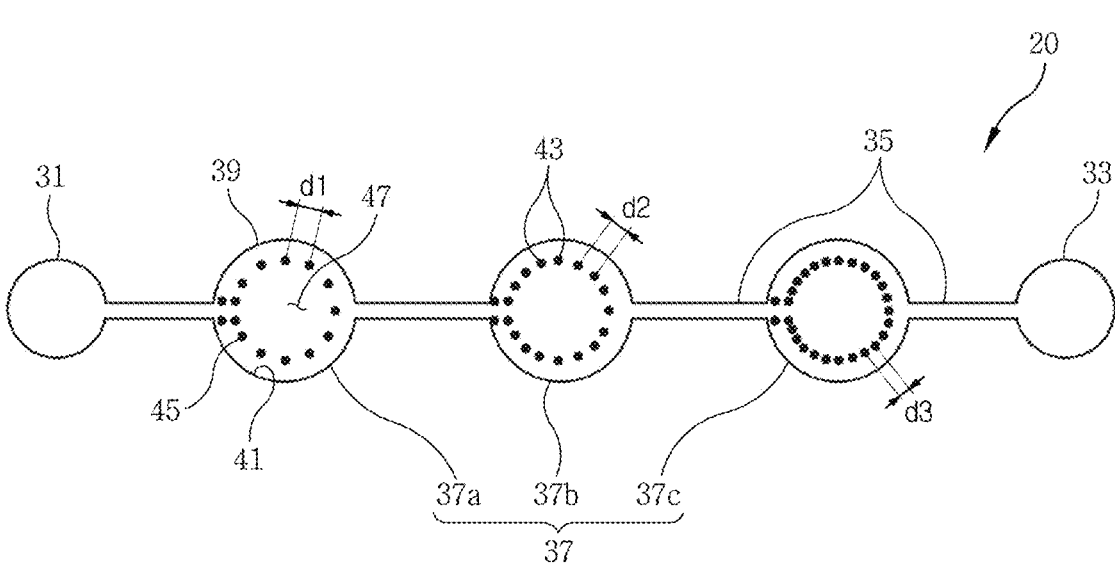
FIG. 2 is a schematic diagram showing a microfluidic channel having a plurality of capture parts in a microplastic detection sensor according to an embodiment of the present disclosure.

Referring to FIGS. 1 and 2, the microplastic detection system 100 according to an embodiment is a system that detects information about microplastic from a liquid sample containing microplastic in a dispersion liquid by using the microplastic detection sensor 10.

The microplastic detection system 100 includes the microplastic detection sensor 10, a sample input unit 80, and a microplastic analysis unit 90.

As described in detail below, the microplastic detection sensor 10 includes the plurality of capture parts 37 and selectively captures (i.e., filters) microplastic contained in the sample by particle size through each capture part 37. In addition, the microplastic detection sensor 10 includes a plurality of radio frequency (RF) resonance structures 60 corresponding to the plurality of capture parts 37, respectively. Each RF resonance structure 60 outputs information about the microplastic captured in the capture part 37 by RF resonance for an RF signal applied to the capture part 37.

The sample input unit 80 injects a liquid sample, which contains microplastic dispersed in a solution, into an inlet 31 of the microplastic detection sensor 10.

The microplastic analysis unit 90 includes a transceiver 91 and a controller 93. The transceiver 91 applies an RF signal to the plurality of RF resonance structures 60 and receives output signals outputted from the plurality of RF resonance structures 60 by means of RF resonance for the applied RF signal. The controller 93 analyzes the applied RF signal and the output signals and calculates information about the microplastic captured in each of the plurality of capture parts 37.

In addition, the microplastic detection system 100 may further include at least one of a preprocessing unit 70, a pump 95, and a dryer 97. The pump 95 and dryer 97 may be included in the microplastic analysis unit 90.

Hereinafter, the microplastic detection system 100 according to an embodiment will be described in detail.

The preprocessing unit 70 performs preprocessing on a sample to increase the detection accuracy of microplastic contained in the sample. That is, the preprocessing unit 70 separates the microplastic from the sample by performing preprocessing to remove organic and inorganic matters from the sample. This preprocessing unit 70 may include an organic matter remover 71, an inorganic matter separator 73, and a floating matter collector 75.

The organic matter remover 71 removes organic matter from the sample by mixing a solute such as hydrogen peroxide with the sample to decompose the organic matter.

The inorganic matter separator 73 performs specific gravity separation on the sample that has passed the organic matter remover 71. That is, the inorganic matter separator 73 mixes a density separation liquid with the sample and separates the inorganic matter and the microplastic using specific gravity. In this case, the microplastic having a low specific gravity floats onto the surface of the mixed solution of the sample and the density separation liquid.

The floating matter collector 75 collects the floating microplastic from the mixed solution in the inorganic matter separator 73. That is, the floating matter collector 75 collects the microplastic contained in the sample by collecting the microplastic floating on the surface of the mixed solution.

As such, when the sample is preprocessed in the preprocessing unit 70, particles other than the microplastic can be removed from the sample, and changes in dielectric properties caused by such particles other than the microplastic can be minimized. As a result, the accuracy of measuring microplastic concentration can be improved.

The sample input unit 80 mixes a dispersion liquid with the floating microplastic collected by the floating matter collector 75 and creates a sample to be input into the microplastic detection sensor 10. The sample input unit 80 inputs the created sample into the microplastic detection sensor 10.

The dispersion liquid disperses the microplastic within the sample so that the microplastic can move stably through the microfluidic channel 35 formed in the microplastic detection sensor 10. For example, the dispersion liquid may be, but is not limited to, ethanol containing a surfactant.

The microplastic detection sensor 10 includes a fluidic channel substrate 20 and a plurality of RF resonance structures 60.

The fluidic channel substrate 20 has an inlet 31 and an outlet 33. The inlet 31 through which a liquid sample containing microplastic dispersed in the dispersion liquid is introduced is formed on one end of the fluidic channel substrate 20, and the outlet 33 is formed on the other end. The fluidic channel substrate 20 has a microfluidic channel 35 formed therein to connect the inlet 31 and the outlet 33. The microfluidic channel 35 moves the sample introduced through the inlet 31 toward the outlet 33 by capillary action. In the fluidic channel substrate 20, a plurality of capture parts 37 are formed along the microfluidic channel 35. The plurality of capture parts 37 selectively capture (or filter) microplastic contained in the sample according to particle size.

The plurality of RF resonance structures 60 corresponding to the plurality of capture parts 37, respectively, are formed on both sides of the fluidic channel substrate 20. The RF resonance structure 60 outputs information about the microplastic captured in the corresponding capture part 37 through RF resonance for the applied RF signal.

The transceiver 91 applies RF signals to the plurality of RF resonance structures 60 under the control of the controller 93. The transceiver 91 receives output signals outputted from the plurality of RF resonance structures 60 by RF resonance for the applied RF signals and transmits them to the controller 93. The output signal may be a reflected wave (reflected signal) or a transmitted wave (transmitted signal) of the RF signal applied to the RF resonance structure 60. For example, the transceiver 91 may apply an RF signal to the RF resonance structure 60 through an electrical coupling scheme and receive a reflected wave as an output signal. Alternatively, the transceiver 91 may apply an RF signal directly to the RF resonance structure 60 and receive a reflected wave as an output signal.

The pump 95 causes, under the control of the controller 93, the sample introduced into the inlet 31 of the microplastic detection sensor 10 to pass through the microfluidic channel 35 and be then smoothly discharged through the outlet 33. The pump 95 may be connected to at least one of the inlet 31 and the outlet 33. When connected to the inlet 31, the pump 95 applies pressure to push the sample toward the outlet 33 so that the sample introduced into the inlet 31 can flow smoothly toward the outlet 33. When connected to the outlet 33, the pump 95 applies a suction force that pulls the dispersion liquid out of the outlet 33 so that the dispersion liquid of the sample that has passed through the capture parts 37 of the microfluidic channel 35 can be smoothly discharged out of the outlet 33.

The pump 95 may be formed integrally with the microplastic detection sensor 10 through a micro-electro mechanical system (MEMS) process. Alternatively, the pump 95 may be implemented as a syringe pump and connected to the inlet 31 or outlet 33 of the microplastic detection sensor 10.

After filtering of the sample inputted to the microplastic detection sensor 10 is completed, the dryer 97 applies heat to the dispersion liquid remaining in the microplastic detection sensor 10 under the control of the controller 93 to dry and thereby remove it.

The controller 93 is a processor that controls the overall operation of the microplastic analysis unit 90. The controller 93 analyzes the RF signal applied to the microplastic detection sensor 10 and the output signal outputted from the microplastic detection sensor 10 in response to the applied RF signal. Through this analysis, the controller 93 calculates information about the microplastic captured in each of the plurality of capture parts 37.

The controller 93 can calculate information about the microplastic captured in each of the plurality of capture parts 37, as follows.

The controller 93 calculates a change in the scattering parameter (S-parameter) of the RF resonance structure 60 according to the microplastic captured in the capture part 37 and thereby calculates the type and concentration of the captured microplastic.

Specifically, the controller 93 applies an RF signal to the RF resonance structure 60 through the transceiver 91 and receives a reflected wave as an output signal. Then, the controller 93 calculates the input reflection coefficient ($S_{11}$) of the S-parameter based on the applied RF signal and the received reflected wave and calculates the concentration and type of the microplastic captured in each of the plurality of capture parts 37.

In this case, the controller 93 can calculate the concentration of the microplastic captured in each of the plurality of capture parts 37 by checking the shift of the resonance frequency based on the input reflection coefficient.

In addition, the controller 93 can calculate the type of the microplastic captured in each of the plurality of capture parts 37 by calculating the dielectric constant and loss tangent value depending on the type of microplastic based on the input reflection coefficient.

Additionally, the controller 93 may apply an RF signal to the RF resonance structure 60 through the transceiver 91 and further receive a transmitted wave as an output signal. Then, the controller 93 can calculate the concentration of the microplastic captured in each of the plurality of capture parts 37 by calculating the transmission coefficient ($S_{21}$) of the S-parameter based on the applied RF signal and the received transmitted wave.

As described above, the controller 93 can calculate the concentration and type of the microplastic contained in the sample for each particle size.

Figure 3:
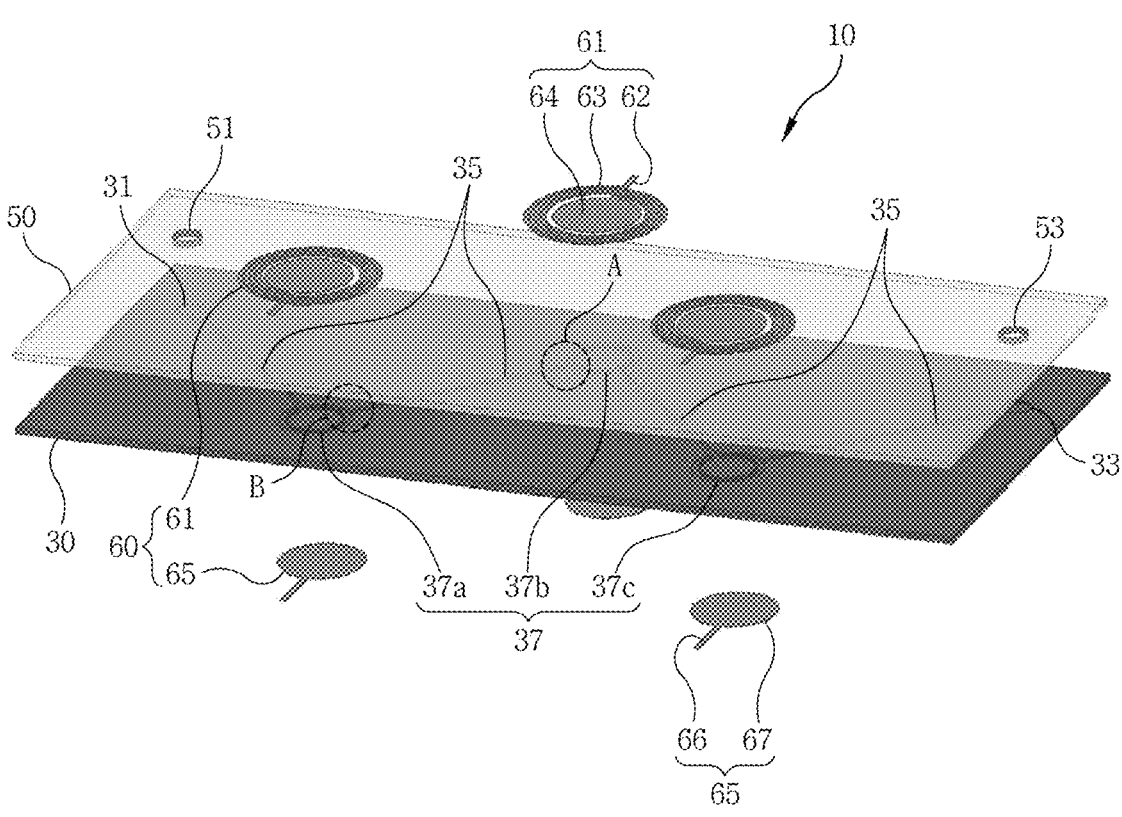
FIG. 3 is an exploded perspective view showing a microplastic detection sensor according to an embodiment of the present disclosure.
Figure 4:
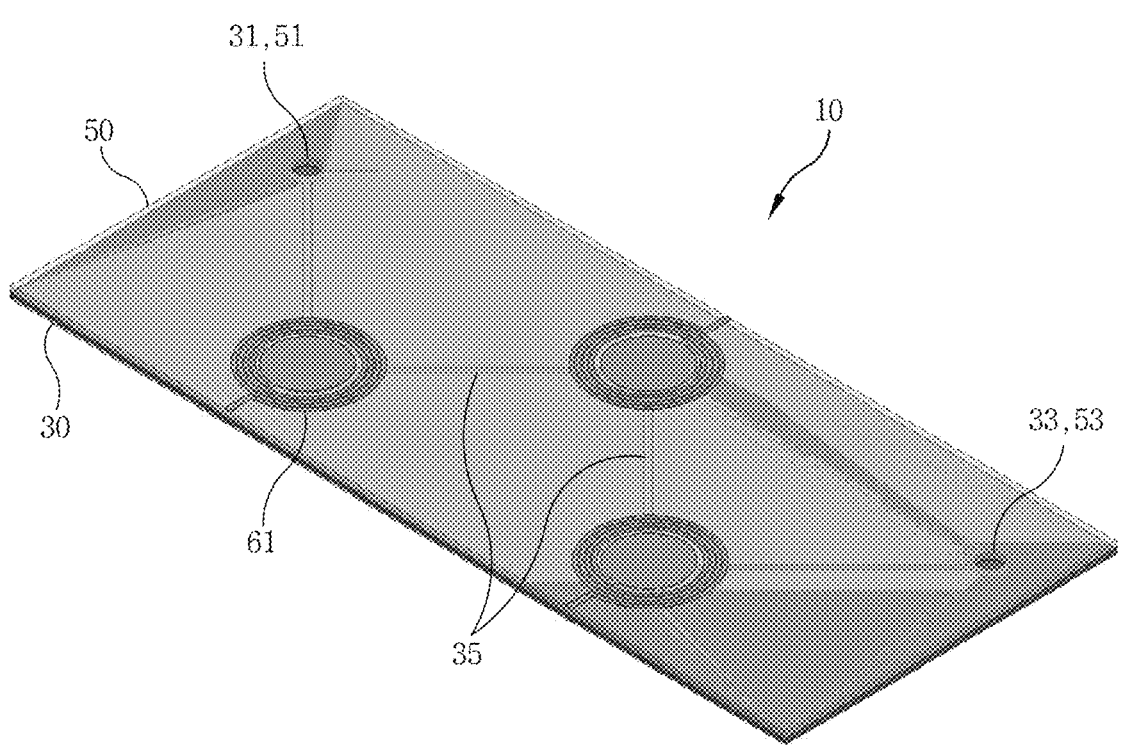
FIG. 4 is a combined perspective view showing the microplastic detection sensor of FIG. 3.
Figure 5:
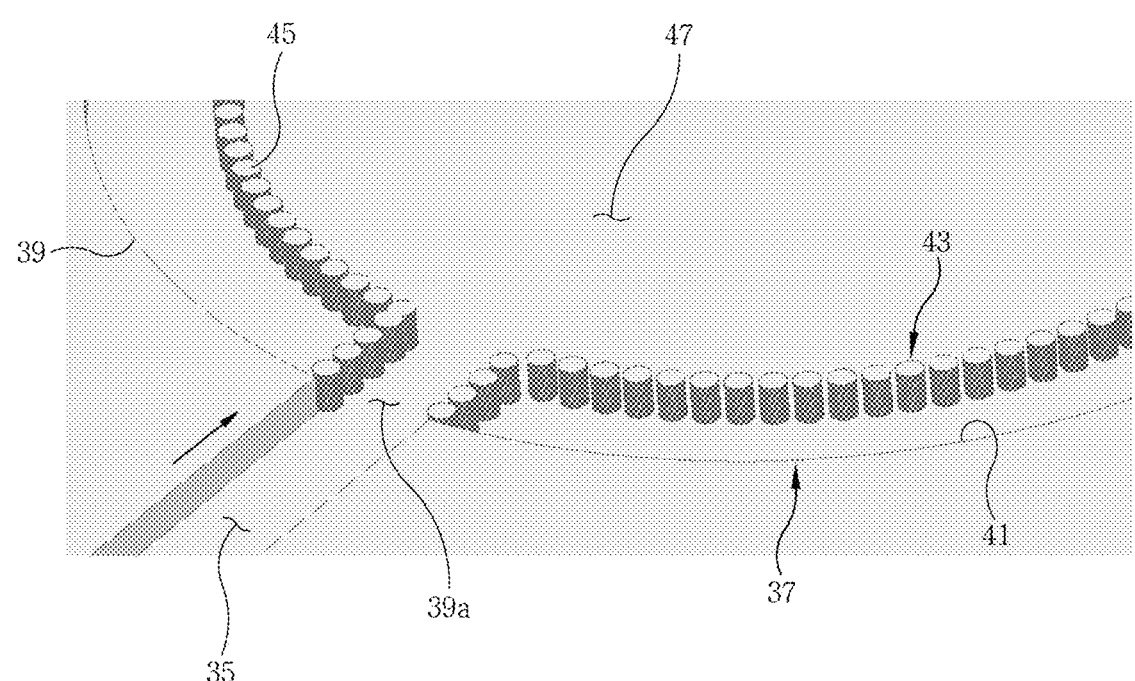
FIG. 5 is an enlarged view showing part A of FIG. 3.
Figure 6:
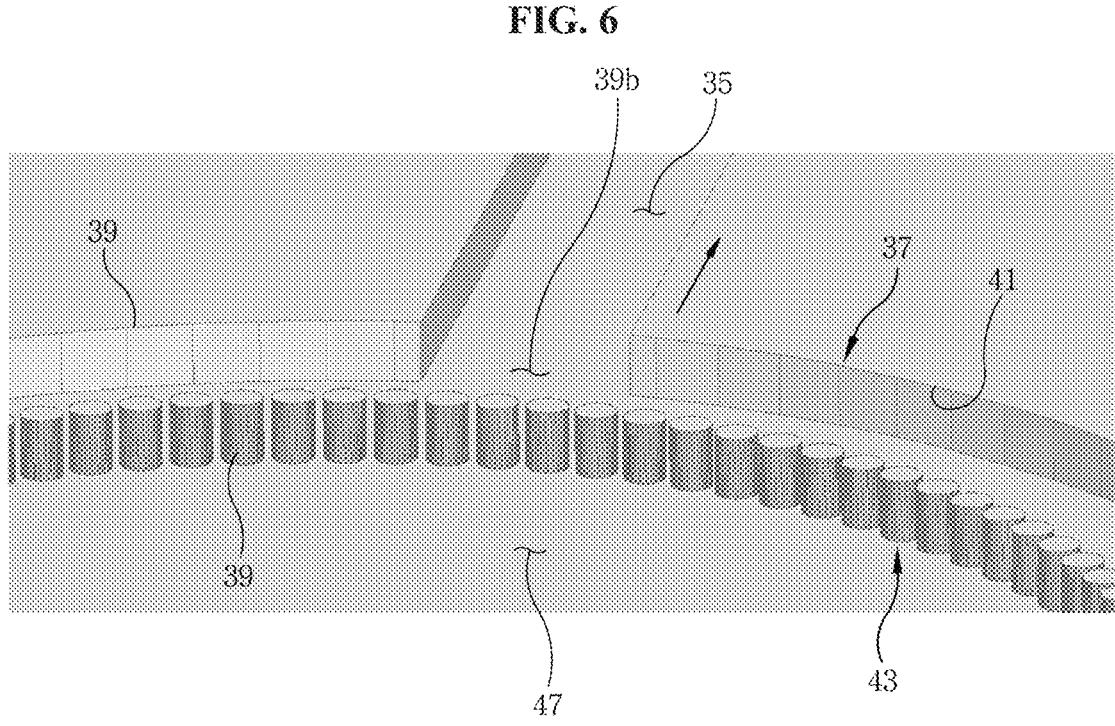
FIG. 6 is an enlarged view showing part B of FIG. 3.

Hereinafter, the microplastic detection sensor 10 according to an embodiment will be described with reference to FIGS. 2 to 6. FIG. 3 is an exploded perspective view showing a microplastic detection sensor 10 according to an embodiment of the present disclosure. FIG. 4 is a combined perspective view showing the microplastic detection sensor 10 of FIG. 3. FIG. 5 is an enlarged view showing part A of FIG. 3. FIG. 6 is an enlarged view showing part B of FIG. 3.

As described above, the microplastic detection sensor 10 includes the fluidic channel substrate 20 and the plurality of RF resonance structures 60.

The fluidic channel substrate 20 includes a lower substrate 30 and an upper substrate 50. The fluidic channel substrate 20 is made of a material that generates good RF resonance, i.e., LC resonance. That is, the material of the lower substrate 30 may be a low-doped silicon material that has high resistance and low conductivity and has good polarization characteristics. The material of the upper substrate 50 may be a material having dielectric properties. The lower substrate 30 has the inlet 31, the outlet 33, the microfluidic channel 35, and the plurality of capture parts 37, formed on the upper surface thereof. The upper substrate 50 covers the upper surface of the lower substrate 30 and has first and second through-holes 51 and 53 connected to the inlet 31 and outlet 33, respectively.

The lower substrate 30 is a silicon substrate, and the inlet 31, the outlet 33, the microfluidic channel 35, and the plurality of capture parts 37 are formed on the upper surface through a MEMS process. The upper substrate 50 is made of glass, silicon, or quartz, and the first and second through-holes 51 and 53 are formed through a MEMS process.

The inlet 31 and the outlet 33 are formed in the fluid channel substrate 20 to be spaced apart from each other, and the microfluidic channel 35 connects the inlet 31 and the outlet 33. The plurality of capture parts 37 are formed along the microfluidic channel 35.

The microfluidic channel 35 is formed as a line-shaped tunnel. To allow the sample to move stably by capillary action, the cross-section of the microfluidic channel 35 may be formed so that the width is greater than the height. The cross-section of the microfluidic channel 35 may be rectangular, and the horizontal and vertical length ratio may be 2:1 to 5:4. For example, the cross-section of the microfluidic channel 35 may be 150 $\mu$m$\times$100 $\mu$m (width$\times$height).

The inlet 31 and the outlet 33 may be formed to be smaller than the capture part 37. Each of the inlet 31, the outlet 33, and the capture part 37 may be formed as a circular disk-shaped space with a thin thickness.

The plurality of capture parts 37 are sequentially arranged from the inlet 31 to the outlet 33 along the microfluidic channel 35, and the particle size of microplastic sequentially captured becomes smaller.

The plurality of capture parts 37 are spaced apart from each other so that RF resonance is independently generated by an RF signal applied to each of the plurality of capture parts 37. That is, in order to prevent the RF resonance generated in each capture part 37 from affecting the RF resonance generated in the neighboring capture part 37, the plurality of capture parts 37 are arranged to be spaced apart from each other in consideration of the frequency of the applied RF signal.

In the case where there are three capture parts 37, they may be referred to as a first capture part 37a, a second capture part 37b, and a third capture part 37c sequentially arranged in a direction from the inlet 31 to the outlet 33 as shown in FIG. 2, for example.

Although three capture parts 37 are exemplarily illustrated, two or other plural capture parts may be implemented. The plurality of capture parts 37 may be implemented in various ways depending on the size of the fluidic channel substrate 20 and the design of the microfluidic channel 35.

For example, in the case of two capture parts 37, they may be connected to the straight microfluidic channel 35 in the fluidic channel substrate 20.

When there are three capture parts 37, they may be connected in series by the straight microfluidic channel 35 as shown in FIG. 2. When the plurality of capture parts 37 are arranged as shown in FIG. 2, the fluidic channel substrate 20 is designed to be long.

In the case of three capture parts 37, they may be connected to both ends and bent points of the V-shaped microfluidic channel 35 as shown in FIG. 3. When considering the inlet 31 and the outlet 33 together, the inlet 31 and the outlet 33 may be connected to both ends of the W-shaped microfluidic channel 35, and the first to the third capture parts 37 may be connected to the three bent points. When the plurality of capture parts 37 are arranged as shown in FIG. 3, there is an advantage in that the fluidic channel substrate 20 is designed shorter than that of FIG. 2.

As shown in FIGS. 2, 5 and 6, each of the plurality of capture parts 37 may include an extended portion 39 and a filter 43.

The expanded portion 39 has a buffering space 41 that is larger than the microfluidic channel 35. Also, the expanded portion 39 has an inlet 39a and an outlet 39b. The sample flows from the microfluidic channel 35 into the buffering space 41 through the inlet 39a and is then discharged from the buffering space 41 to the microfluidic channel 35 through the outlet 39b.

The filter 43 is formed inside the expanded portion 39 and filters a target microplastic among several types of microplastic contained in the sample introduced into the expanded portion 39. The filter 43 has a plurality of filter rods 45 that are arranged at regular intervals inside the expanded portion 39 and form a capture space 47 that filters and captures the target microplastic. The interval (i.e., spacing) between the filter rods 45 is smaller than the size of the target microplastic. The dispersion liquid contained in the sample passes between the filter rods 45.

The filter rod 45 may be formed in the form of a streamlined pillar, for example, a cylinder or an elliptic cylinder, so that the sample can be discharged smoothly after the target microplastic is filtered.

The capture space 47 is open and communicated with the inlet 39a of the expanded portion 39 so that the sample can flow into the capture space 47 through the inlet 39a of the expanded portion 39. That is, to form the inlet 39a of the expanded portion 39, the filter rods 45 defining the capture space 47 are arranged to be spaced apart from each other at the inlet 39a. The capture space 47 is formed relatively small inside the expanded portion 39 so that the sample flowing into the capture space 47 can be smoothly discharged from the capture space 47 after filtering. That is, a free space formed outside the capture space 47 within the buffering space 41 allows the filtered sample to smoothly flow out toward the outlet 39b of the expanded portion 39.

Referring to FIG. 2, the plurality of capture parts 37 include first to third capture parts 37a, 37b, and 37c. A spacing d1, d2, d3 between the filter rods 45 decreases from the first capture part 37a to the third capture part 37c. Accordingly, the size of the target microplastic captured becomes smaller from the first capture part 37a to the third capture part 37c. That is, if the spacing between the filter rods 45 of the first capture part 37a is d1, the spacing between the filter rods 45 of the second capture part 37b is d2, and the spacing between the filter rods 45 of the third capture part 37c is d3, d1>d2>d3.

As described above, the type and concentration of microplastic can be calculated through a change in the S-parameter of the RF resonance structure 60 according to the microplastic captured in the capture part 37. That is, the frequency representing the S-parameter changes depending on the type and amount of the microplastic captured in the capture part 37 located within the RF resonance structure 60.

Therefore, by applying an RF signal having a certain bandwidth from the resonance frequency of the RF resonance structure 60 to the resonance structure 60 in order to drive the RF resonance structure 60 located in the capture part 37 and then measuring the S-parameter, it is possible to identify the shift in resonance frequency of the RF resonance structure 60 depending on the concentration of microplastic. For example, the controller 93 can calculate the concentration and type of microplastic captured in each of the plurality of capture parts 37 by calculating the input reflection coefficient $(S_{11})$ of the S-parameter based on the applied RF signal and reflected wave.

The higher the dielectric constant and concentration of microplastic, the lower the resonance frequency of the RF resonance structure 60. In order to more accurately calculate the concentration and type of microplastic, it is necessary to accurately control the amount of sample inputted.

The RF resonance structure 60 is designed to perform RF resonance by an applied RF signal and to perform RF resonance for the RF signal of a 1 to tens of GHz band in order to reduce the size of the microplastic detection sensor 10. That is, although the RF resonance structure 60 can be designed to perform RF resonance in a band below GHz, this case has the disadvantage of having to be designed larger than the size of the microplastic detection sensor 10 designed to perform RF resonance in the GHz band. This is because the spacing between the RF resonance structures 60 designed not to interfere with each other during RF resonance is proportional to the frequency of the RF signal.

Therefore, the RF resonance structure 60 according to an embodiment is designed to perform RF resonance for RF signals in the 1 to tens of GHz band, thereby reducing the size of the microplastic detection sensor 10.

Each of the plurality of RF resonance structures 60 includes an upper resonance pattern 61 and a lower resonance pattern 65. The upper resonance pattern 61 is formed on the upper surface of the upper substrate 50 above the capture part 37. The lower resonance pattern 65 is formed on the lower surface of the lower substrate 30 below the capture part 37.

The RF resonance structure 60 may be formed by forming an electrically conductive metal layer on each of the upper and lower substrates 50 and 30 and then patterning the metal layer through photolithography. Alternatively, the RF resonance structure 60 may be formed through a printing process using electrically conductive ink. As a material of the RF resonance structure 60, at least one of copper, aluminum, nickel, gold, and alloy thereof may be used.

The upper resonance pattern 61 may include an upper feed pad 62, a spiral pattern 63, and an upper circular pattern 64. The upper circular pattern 64 is formed to cover the capture part 37 in a circular shape. The spiral pattern 63 has one end connected to the upper circular pattern 64 and is formed as a plurality of circular spirals to surround the upper circular pattern 64. The upper feed pad 62 is connected to the other end of the spiral pattern 63 and extends to the nearby outer surface of the upper substrate 50.

The lower resonance pattern 65 may include a lower feed pad 66 and a lower circular pattern 67. The lower circular pattern 67 is formed to cover the capture part 37 in a circular shape. The lower circular pattern 67 may be formed at a position facing the upper circular pattern 64 vertically, and may be formed in the same shape as the upper circular pattern 64. The lower feed pad 66 is connected at one end to the lower circular pattern 67 and extends to the nearby outer surface of the lower substrate 30. The lower feed pad 66 may be formed at a position facing the upper feed pad 62 vertically.

The RF resonance structure 60 can receive an RF signal in an electrical coupling scheme and output a reflected wave. That is, the RF resonance structure 60 can receive an RF signal through the upper feed pad 62 in an electrical coupling scheme and output a reflected wave through the lower feed pad 66.

Meanwhile, in the fluidic channel substrate 20 according to this embodiment, it has been described that the inlet 31, the outlet 33, the microfluidic channel 35, and the plurality of capture parts 37 are formed on the upper surface of the lower substrate 30, but this is exemplary only. In one alternative embodiment, the inlet 31, the outlet 33, the microfluidic channel 35, and the plurality of capture parts 37 may be formed on the lower surface of the upper substrate 50, which is in contact with the upper surface of the lower substrate 30. In another alternative embodiment, the inlet 31, the outlet 33, the microfluidic channel 35, and the plurality of capture parts 37 may be formed on each of the upper surface of the lower substrate 30 and the lower surface of the upper substrate 50, using a MEMS process.

Additionally, in the fluidic channel substrate 20 according to this embodiment, it has been described that the first and second through-holes 51 and 53 are formed in the upper substrate 50, but this is only an example. In an alternative embodiment, the first through-hole 51 connected to the inlet 31 may be formed in the upper substrate 50, and the second through-hole 53 connected to the outlet 33 may be formed in the lower substrate 30. That is, without forming the second through-hole 53 in the upper substrate 50, it is possible to form the outlet 33 and the second through-hole 53 together in the lower substrate 30.

Figure 7:
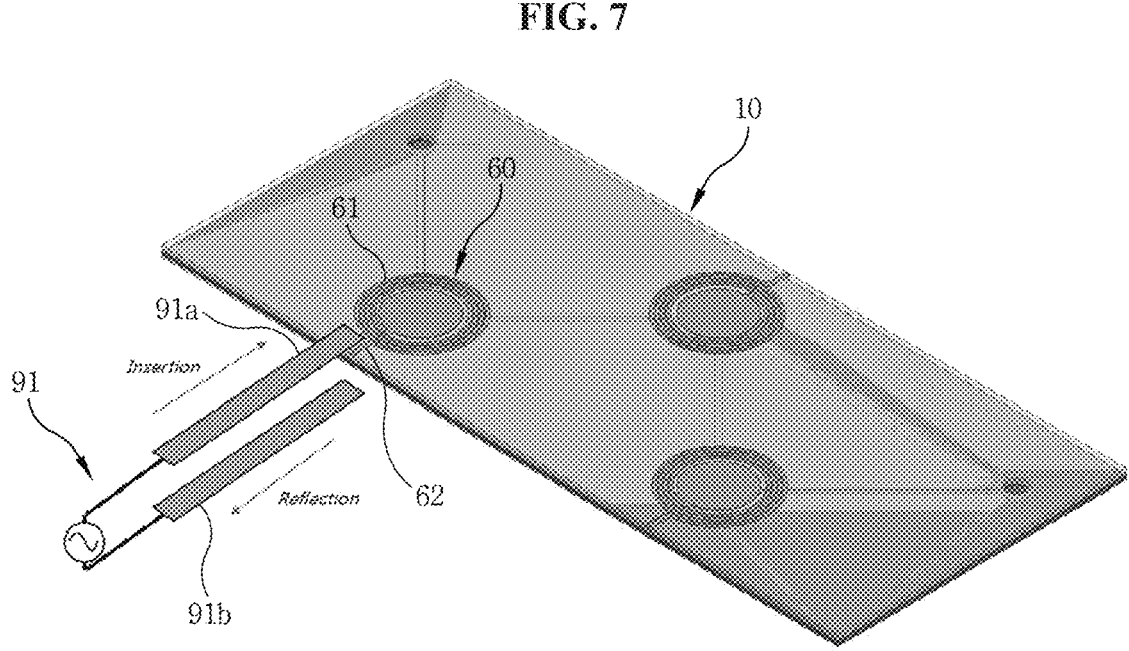
FIG. 7 is an example diagram illustrating a process in which a transceiver transmits and receives an RF signal to and from an RF resonance structure by electrical coupling in the microplastic detection sensor of FIG. 4.

Hereinafter, a process in which the transceiver 91 transmits and receives an RF signal to and from the microplastic detection sensor 10 according to this embodiment will be described with reference to FIGS. 1, 3, and 7. FIG. 7 is an example diagram illustrating a process in which a transceiver 91 transmits and receives an RF signal to and from an RF resonance structure 60 by electrical coupling in the microplastic detection sensor 10 of FIG. 4.

The transceiver 91 applies an RF signal to the RF resonance structure 60 of the microplastic detection sensor 10 in an electrical coupling scheme, and receives a reflected wave by RF resonance from the RF resonance structure 60. The transceiver 91 includes a transmitting feed 91a and a receiving feed 91b. In order to transmit and receive RF signals by electrical coupling, the transmitting feed 91a and the receiving feed 91b are disposed close to the upper feed pad 62 and the lower feed pad 66 of the RF resonance structure 60, respectively. The transmitting feed 91a applies an RF signal to the upper feed pad 62 of the RF resonance structure 60 by electrical coupling. The receiving feed 91b receives a reflected wave, outputted from the RF resonance structure 60 to the lower feed pad 66 by RF resonance, through electrical coupling.

The microplastic detection sensor 10 according to this embodiment has a structure using a microstrip transmission line. In addition, the microplastic detection sensor 10 has a structure of capturing microplastic particles between capacitors by utilizing the RF resonance structure 60 and reading out the amount of captured microplastic.

In other words, the microplastic detection sensor 10 according to this embodiment can calculate the concentration and type of microplastic based on the principle that dielectric properties are changed between the RF resonance structures 60 depending on the state of the sample containing microplastic passing through the microfluidic channel 35. Since sensitivity to changes in dielectric properties of microplastic captured by the RF resonance structure 60 is improved, the concentration and type of microplastic can be accurately calculated.

The microplastic detection sensor 10 according to this embodiment can be manufactured based on the MEMS process, so it can be mass-produced at low cost. In addition, the microplastic detection sensor 10 according to this embodiment, unlike typical optical measurement methods, is capable of calculating the concentration and type of microplastic captured by size through variation in RF signal characteristics according to changes in dielectric properties, it is easy to calculate the concentration and type of microplastic by size.

While the present disclosure has been particularly shown and described with reference to an exemplary embodiment thereof, it will be understood by those skilled in the art that various changes in form and details may be made therein without departing from the scope of the present disclosure as defined by the appended claims.

What is claimed is:

1. A microplastic detection sensor comprising:

a fluidic channel substrate comprising an inlet and an outlet, the inlet formed on a first end of the fluidic channel substrate and configured to introduce a liquid sample containing microplastic dispersed in a dispersion liquid, the outlet formed on a second end of the fluidic channel substrate, the fluidic channel substrate further comprising a microfluidic channel formed therein to connect the inlet and the outlet and move the sample introduced through the inlet toward the outlet by capillary action, and the fluidic channel substrate further comprising a plurality of capture parts formed along the microfluidic channel and configured to selectively capture the microplastic contained in the sample according to a particle size; and a plurality of radio frequency (RF) resonance structures respectively corresponding to the plurality of capture parts formed on first and second sides of the fluidic channel substrate, each of the RF resonance structures configured to output information about the microplastic captured in the corresponding capture part through RF resonance for an applied RF signal.

2. The microplastic detection sensor of claim 1, wherein the microfluidic channel is formed as a line-shaped tunnel, and a cross-section of the microfluidic channel is formed so that a width is greater than a height.

3. The microplastic detection sensor of claim 2, wherein the plurality of capture parts are sequentially arranged from the inlet to the outlet along the microfluidic channel, and a particle size of the microplastic sequentially captured becomes smaller.

4. The microplastic detection sensor of claim 3, wherein the plurality of capture parts are spaced apart from each other so that RF resonance is independently generated by an RF signal applied to each of the plurality of capture parts.

5. The microplastic detection sensor of claim 4, wherein each of the plurality of capture parts includes:

an extended portion having a buffering space that is larger than the microfluidic channel, the extended portion further comprising an inlet and an outlet such that the sample flows from the microfluidic channel into the buffering space through the inlet and is then discharged from the buffering space to the microfluidic channel through the outlet; and a filter formed inside the expanded portion and configured to filter a target microplastic among several types of the microplastic contained in the sample introduced into the expanded portion.

6. The microplastic detection sensor of claim 5, wherein each filter comprises a plurality of filter rods that are arranged at regular intervals inside the expanded portion and form a capture space that filters and captures the target microplastic, wherein the capture space is in fluid communication with the inlet of the expanded portion to allow the sample to flow into the capture space, and wherein the interval between the filter rods is smaller than a size of the target microplastic.

7. The microplastic detection sensor of claim 1, wherein the fluidic channel substrate includes:

a lower substrate comprising the inlet, the outlet, the microfluidic channel, and the plurality of capture parts, the lower substrate formed on an upper surface thereof; and an upper substrate covering the upper surface of the lower substrate and comprising first and second through-holes connected to the inlet and outlet, respectively.

8. The microplastic detection sensor of claim 7, wherein the lower substrate comprises a silicon substrate, and wherein the inlet, the outlet, the microfluidic channel, and the plurality of capture parts are formed on the upper surface of the lower substrate through a micro-electro mechanical system (MEMS) process, wherein the upper substrate comprises glass, silicon, or quartz, and wherein the first and second through-holes are formed through the MEMS process.

9. The microplastic detection sensor of claim 7, wherein each of the plurality of RF resonance structures includes:

an upper resonance pattern formed on an upper surface of the upper substrate above the capture part; and a lower resonance pattern formed on a lower surface of the lower substrate below the capture part.

10. The microplastic detection sensor of claim 9, wherein each RF resonance structure is configured to perform RF resonance for applied RF signals in a 1 to tens of GHz band.

11. The microplastic detection sensor of claim 9, wherein each RF resonance structure is configured to receive an RF signal through electrical coupling and outputs a reflected wave.

12. A microplastic detection system comprising:

the microplastic detection sensor of claim 1;

a sample injector configured to inject the liquid sample, which contains the microplastic dispersed in a solution, into the inlet of the microplastic detection sensor;

a transceiver configured to apply an RF signal to the plurality of RF resonance structures and receive output signals outputted from the plurality of RF resonance structures through RF resonance for the applied RF signal; and a controller configured to analyze the applied RF signal and the output signals and calculate information about the microplastic captured in each of the plurality of capture parts.

13. The microplastic detection system of claim 12, wherein the transceiver is configured to apply the RF signal to the RF resonance structure through an electrical coupling scheme and receive a reflected wave as the output signal.

14. The microplastic detection system of claim 13, wherein the controller is configured to calculate an input reflection coefficient ($S_{11}$) based on the applied RF signal and the received reflected wave and calculate concentration and type of the microplastic captured in each of the plurality of capture parts.

15. The microplastic detection system of claim 14, wherein the controller is configured to calculate the concentration of the microplastic captured in each of the plurality of capture parts by checking a shift of resonance frequency based on the input reflection coefficient.

16. The microplastic detection system of claim 14, wherein the controller is configured to calculate the type of the microplastic captured in each of the plurality of capture parts by calculating a dielectric constant and loss tangent value depending on the type of the microplastic based on the input reflection coefficient.

* * * * *